United States Patent [19]
Siefken

[11] Patent Number: 5,463,596
[45] Date of Patent: * Oct. 31, 1995

[54] NONINVASIVE ULTRASONIC PROXIMITY DETECTOR FOR A FLUID ACTUATED CYLINDER

[75] Inventor: Allen J. Siefken, Lake Oswego, Oreg.

[73] Assignee: The Rexroth Corporation, Lexington, Ky.

[*] Notice: The portion of the term of this patent subsequent to Oct. 17, 2012, has been disclaimed.

[21] Appl. No.: 316,897

[22] Filed: Oct. 3, 1994

Related U.S. Application Data

[63] Continuation of Ser. No. 27,370, Mar. 8, 1993.

[51] Int. Cl.$^6$ .................................................. G01S 15/00
[52] U.S. Cl. ................................................................ 367/98
[58] Field of Search .............................. 367/98, 99, 87; 73/119 R, 120

[56] References Cited

U.S. PATENT DOCUMENTS

| | | | |
|---|---|---|---|
| 3,948,086 | 4/1976 | Kitada | 73/67.7 |
| 4,307,611 | 12/1981 | Opara | 73/597 |
| 4,345,657 | 8/1982 | Howard | 175/40 |

(List continued on next page.)

OTHER PUBLICATIONS

Hydro–Line Manufacturing Company brochure apparently dated Nov. 1988.
Electro Corporation "PCU Sensors" brochure, pp. 4 and 13.
A short summary of ultrasonic flowmeter Model UFT–603 manufactured by Davis Instrument Mfg. of Baltimore, Md.
"Magnetostrictive Linear Displacement Transducers: The Sensor of the 90's", William Brenner, *Sensors Expo West Proceedings* 1991, pp. 106C–1–106C–7.
MTS Systems Corporation brochure entitled "Temposonics II Linear Displacement Transducers," copyright notice dated 1990.

"Ultrasonic Signal–Processing Concepts For Measuring the Thickness of Thin Layers", Joseph L. Rose and Paul A. Meyer, *Materials Evaluation*, Dec. 1974, pp. 249–258.

*Primary Examiner*—Daniel T. Pihulic
*Attorney, Agent, or Firm*—Ingersoll Buchanan; Michael L. Dever

[57] ABSTRACT

The invention provides a generally noninvasive device and method for detecting a reciprocative piston located within a cylinder bore. An ultrasonic transducer mounted on the outside of the cylinder wall selectively generates an ultrasonic transmission signal directed through the cylinder. The transducer then receives any desired ultrasonic signal produced by propagation of the ultrasonic transmission signal. Control circuitry processes electrical signals produced on the ultrasonic transducer by the propagated ultrasonic signal to indicate presence or absence of the piston.

In presently preferred embodiments, the control circuitry determines whether the piston is present by comparing a signal level in the received ultrasonic signal during a sample time window in which the desired signal may be expected with a predetermined threshold level. To perform this function, electrical signals produced on the transducer by the propagated ultrasonic signal are first passed to an amplifier having a selected gain. An output of the amplifier is then fed to an detector circuit which produces an detection level signal which may be representative of energy present in the received ultrasonic signal during the sample time window. Comparator means then perform the comparison of the detection signal with the threshold.

In many embodiments, it is generally desirable to utilize two piston sensors respectively located to indicate presence of the piston at limits of its reciprocative stroke. For greatest flexibility, some presently preferred embodiments of the device are capable after being initially activated to identify with which cylinder model, from a plurality of such models, the detector is being used. In this way, the device can automatically set certain operating parameters to optimize signal-to-noise ratio. The device may also incorporate light emitting diodes or other indicators to alert the user of current operating conditions.

26 Claims, 11 Drawing Sheets

U.S. PATENT DOCUMENTS

| | | | |
|---|---|---|---|
| 4,444,049 | 4/1984 | Hitchcock | 73/119 |
| 4,520,660 | 6/1985 | Hitchcock | 73/120 |
| 4,649,527 | 3/1987 | Forster et al. | 367/108 |
| 4,755,637 | 7/1988 | Turck | 200/82 |
| 4,803,318 | 2/1989 | Lymburner | 200/82 |
| 4,879,440 | 11/1989 | Lymburner | 200/82 |
| 4,912,291 | 3/1990 | Hepperle et al. | 200/82 |
| 4,914,388 | 4/1990 | Kalista et al. | 324/207 |
| 5,008,862 | 4/1991 | Shimamoto et al. | 367/105 |

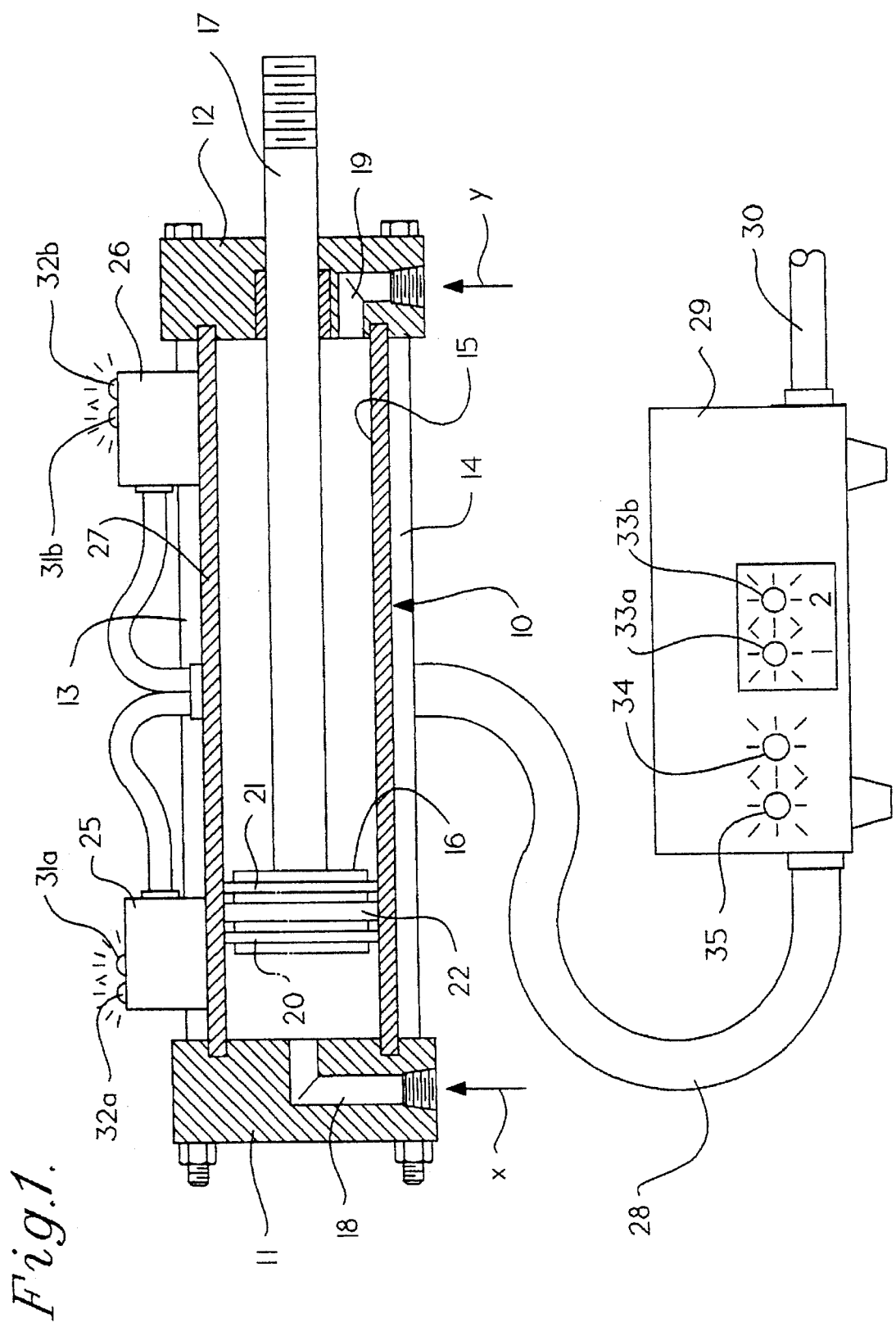

Fig.7.
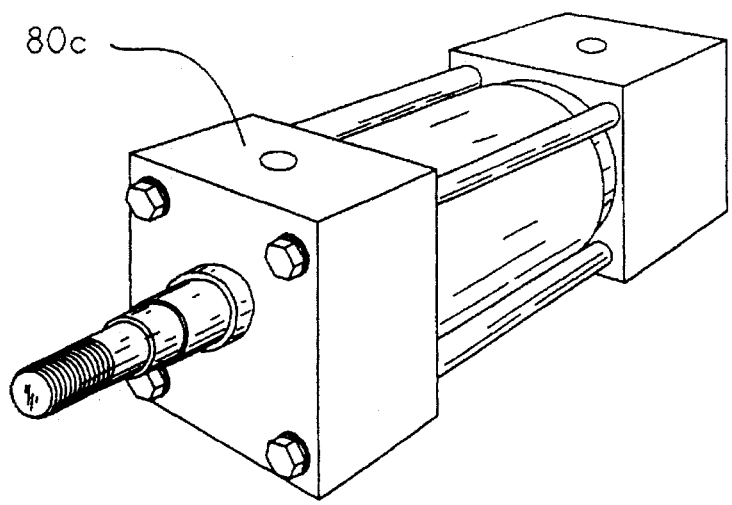
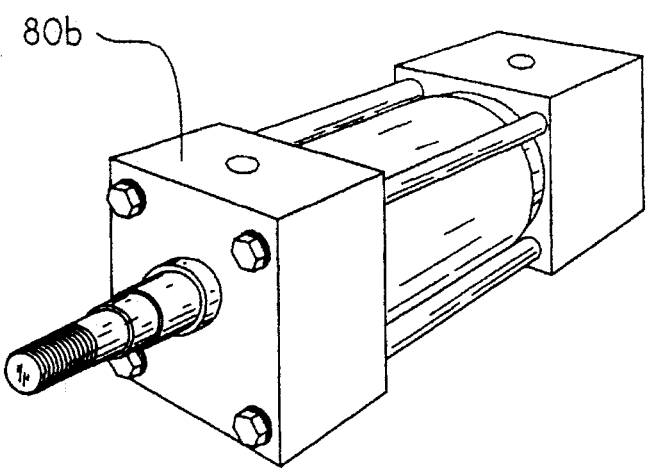
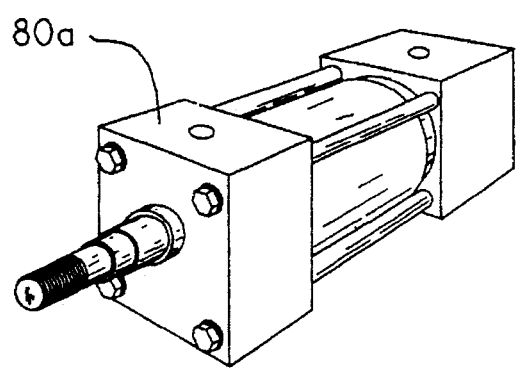

NONINVASIVE ULTRASONIC PROXIMITY DETECTOR FOR A FLUID ACTUATED CYLINDER

This application is a continuation of application Ser. No. 08/027,370, filed Mar. 8, 1993, pending.

BACKGROUND OF THE INVENTION

1. Field of the Invention

The present invention relates to a proximity detector utilized to sense the presence of a piston reciprocatively mounted within a cylinder bore. More particularly, the invention relates to a device and method for providing such a proximity detector which is generally noninvasive of the cylinder housing assembly.

2. Description of the Prior Art

In the operation and control of fluid actuated cylinders, proximity detector devices are often utilized to indicate presence of the moving piston therein. Frequently, such devices are employed to detect the piston at respective terminal limits of its reciprocative stroke. In a manufacturing environment, for example, this information can be advantageously used to maintain efficient workpiece flow.

Prior art proximity detector devices have generally required modification of the cylinder housing assembly. For example, some commercially available proximity detectors utilize a magnetic detector mounted externally of the cylinder assembly to detect a magnetic member attached to the piston. Passage of the magnetic member causes activation of the detector, thus affirmatively indicating presence of the piston. Generally, however, such devices are limited to applications in which the cylinder is constructed of a nonmagnetic material such as aluminum. Hydraulically actuated cylinders are typically made of steel, which inhibits the external detection of a magnetic field. Other proximity detector devices, equally useable with pneumatically and hydraulically driven cylinders, require an even greater degree of invasive modification to the cylinder assembly.

The phenomena of ultrasonic energy propagation has been utilized in a number of applications. For example, nondestructive testing (NDT) techniques often utilize ultrasonic pulses to detect flaws in metal and weld joints. Ultrasonic energy propagation has also been used to measure the flow of fluid in a conduit. Furthermore, various devices have been constructed wherein distance to an object or thickness of a workpiece is measured by the duration between transmission of an ultrasonic pulse and reception of the subsequent echo.

One such device is used to measure the position of a piston moving within a hydraulic cylinder. The ultrasonic transducer in this device is invasively mounted to the end cap of the cylinder. An ultrasonic pulse is transmitted into the hydraulic fluid coaxial to movement of the piston. An echo is reflected from the face of the piston and returns to the transducer after a duration proportional to the distance from the transducer.

SUMMARY OF THE INVENTION

The invention provides a generally noninvasive device and method for detecting a reciprocative piston located within a cylinder bore. The device includes transmitter means mounted on the outside of the cylinder wall to selectively generate an ultrasonic transmission signal directed through the cylinder wall into the cylinder bore. Receiver means also mounted on the cylinder wall receive any desired ultrasonic signal resulting from propagation of the transmitted signal through at least part of the cylinder assembly. This received signal is converted to an electrical signal which is processed by control means to indicate presence or absence of the piston.

In some presently preferred embodiments, the transmitter means and receiver means may comprise a single ultrasonic transducer incorporated within a piston sensor positionable on the outside of the cylinder wall. In many applications it may be desirable to position two such sensors such that the piston may be detected at respective limits of its reciprocative stroke. The transducer of each piston sensor would selectively emit an ultrasonic transmission signal into the cylinder assembly. An ultrasonic echo signal later returns to the transducer and converted to an electrical echo signal. This electrical echo signal contains information which can be processed by the control means to indicate presence or absence of the piston.

The control means in presently preferred embodiments is operative to determine whether the piston is present adjacent the transducer by comparing a selected threshold level with a signal level in the ultrasonic echo signal during a selected sample time window. This may be accomplished by first passing the electrical echo signal to amplifier means having a selected gain. An output of the amplifier means is then fed to a signal level detection means which produces a detection signal representative of energy present in the ultrasonic echo signal during the sample time window. Comparator means perform the comparison of the detection signal with the selected threshold level.

To enhance immunity from noise and other extraneous influences, a number of such detection signals may be produced from a corresponding number of respective ultrasonic transmission signals generated in rapid succession. These detection signals may then be averaged or otherwise evaluated before comparison with the threshold level. A degree of hysteresis may be provided by utilizing a low threshold level for affirmative indication that the piston is not present adjacent the transducer. In this case, a piston would be indicated as absent only if the value of the detection signal is below the low threshold level. A detection signal between the high and low thresholds could be interpreted to not affect the prevailing state.

While the device may be dedicated to a particular cylinder model, greater flexibility is achieved if adaptability for use with any one of a number of different sized power actuated cylinder models is facilitated. In presently preferred embodiments, this capability may be automatically provided so long as the respective cylinder models have at least one recognizable ultrasonic propagation characteristic. Typically, this recognizable characteristic may be a particular time-of-flight between generation of an ultrasonic transmission signal and first receipt of the corresponding echo. The control means may derive this time-of-flight measurement by comparing a preselected threshold level with energy levels in sequentially produced ultrasonic echo signals during corresponding of successively delayed sample time windows.

BRIEF DESCRIPTION OF THE DRAWINGS

FIG. 1 is an elevation of a proximity detector device constructed in accordance with the invention having two piston sensors positioned on a cylinder housing shown in partial section to illustrate the reciprocative piston therein.

FIG. 7 is a perspective view of a plurality of differently sized power actuated cylinder models.

FIG. 13 illustrates a lookup table containing characteristic and parameter information utilized by the four tests shown generally in FIG. 10.

DETAILED DESCRIPTION OF PRESENTLY PREFERRED EMBODIMENTS

Figure 1A:
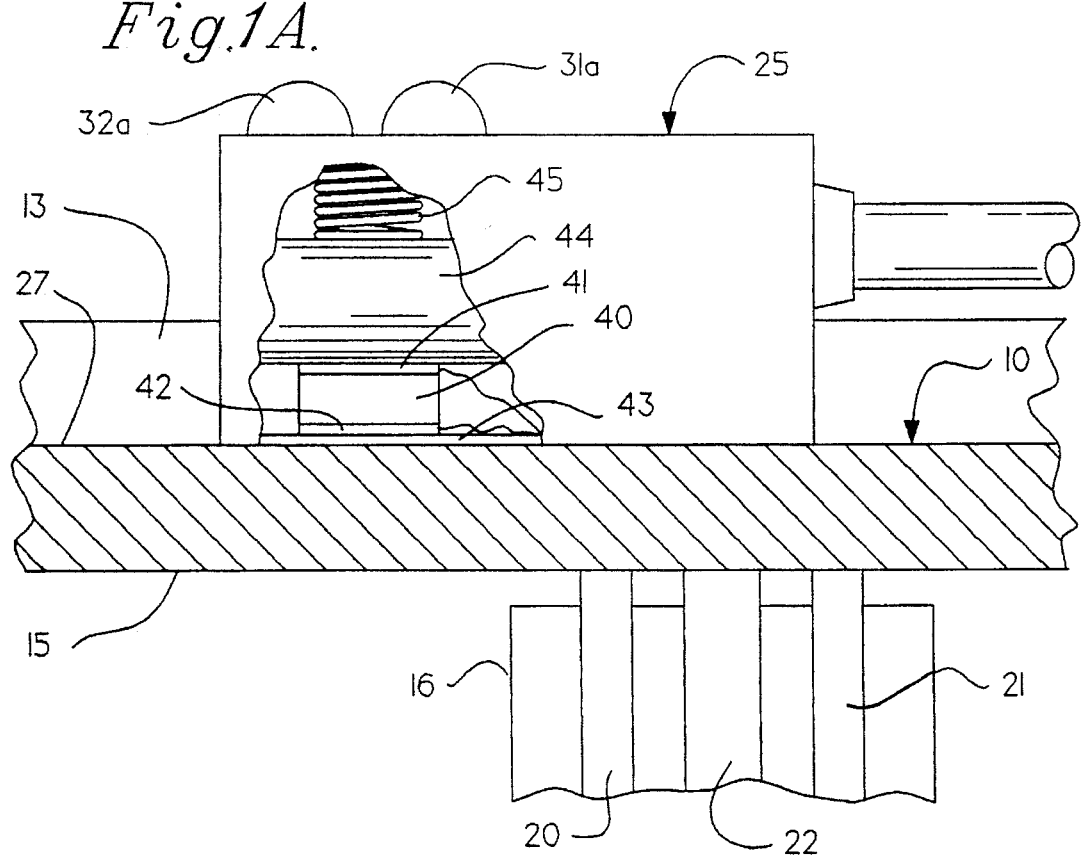
FIG. 1A is an enlarged fragmentary view illustrating one of the piston sensors of FIG. 1 partially cut away to reveal an ultrasonic transducer therein.

FIG. 1 illustrates a presently preferred embodiment of the proximity detector of the invention utilized in conjunction with a typical power actuated cylinder assembly. The cylinder assembly generally comprises a cylinder wall 10 closed at each end by end caps 11 and 12. End caps 11 and 12 are maintained securely in position by a number of tie rods or bolts, such as tie rods 13 and 14. Inner surface 15 of cylinder wall 10 defines a cylinder bore within which piston 16 is located. Piston 16, which is attached to piston rod 17, is movable within the cylinder bore between respective terminal limits of a reciprocative stroke.

in this case, piston 16 is actuated by fluid, such as hydraulic fluid, passed into the cylinder housing through fluid passages 18 and 19. Specifically, ingress of fluid into the cylinder bore through fluid passage 18 (as shown by arrow "x") fills an expandable fluid chamber in front of piston 16. This causes piston 16 to move to the right. Similarly, piston 16 may be moved to the left by ingress of fluid through fluid passage 19 (as shown by arrow "y").

Typically, piston 16 will be equipped with seal rings, such as rings 20 and 21, to prevent fluid from escaping the respective expandable fluid chambers. Piston 16 may also include a wear ring 22 to minimize frictional wear to surface 15.

In presently preferred embodiments, the proximity detector device includes a pair of piston sensors 25 and 26 respectively positioned to detect piston 16 at or near the terminal limits of its reciprocative stroke. In other embodiments, one sensor or a plurality of sensors can be mounted where it is desirable to detect the presence or absence of a movable member, such as piston 16. Sensors 25 and 26 are mounted on the outside surface 27 of cylinder wall 10 and may be attached in any appropriate manner which provides secure placement. Typically, such attachment may be effected by clamping piston sensors 25 and 26 to tie rod 13. Electrical signals from sensors 25 and 26 are passed via interconnecting cable 28 to control circuitry within housing 29. The control circuitry processes these electrical signals to determine the presence or absence of piston 16 adjacent the respective of sensors 25 or 26. The control circuitry may then produce control signals indicating the state of piston 16 which may be passed to external controllers or the like via output line 30. Although housing 29 is shown as not being attached to the cylinder assembly, the control circuitry therein may be miniaturized, such as by using application specific integrated circuits (ASICs), to facilitate such attachment.

The device may include various user interface features to provide ready indication of current operating conditions. For example, piston sensors 25 and 26 may include respective light emitting diodes (LED) 31a and 31b of a first color, such as red, indicating that piston 16 is present thereunder. Similarly, LEDs 32a and 32b having a second color, such as yellow, may also be provided to indicate that secure placement of the respective of piston sensor 25 or 26 to cylinder wall 10 cannot be confirmed. Thus, the operator can be alerted that attention is required. Similarly, housing 29 may have red LEDs 33a and 33b respectively corresponding to LEDs 31a and 31b. A yellow LED 34 may also be provided on housing unit 29 to alert the operator that one of piston sensors 25 and 26 is not properly attached to cylinder wall 10. Additionally, the invention offers the capability of utilizing an infrared LED 35 to provide interface with a wireless printer, such as the Hewlett Packard HP 82240B, which receives an infrared input. In this way, printed information, such as whether the detector device is operating properly, the number of cylinder operations left before service is required, and local product distributors (name, address and phone number), may be readily provided to the operator.

It can thus be seen that the presence of piston 16 is detected through cylinder wall 10 by piston sensors 25 and 26. This is accomplished according so the invention using high frequency energy propagation through "particle displacement" referred to more simply as "ultrasound." Specifically, piston sensors 25 and 26 generate a short ultrasonic signal which is directed through the cylinder wall 10 into the cylinder bore. This ultrasonic signal echoes throughout the cylinder. Each acoustic impedance change in the transmission path transforms and changes the ultrasonic signal. Eventually, some of the transmitted energy is received by the piston sensor and may be converted into an electrical echo signal. Cases in which piston 16 is present or absent beneath the respective of piston sensors 25 and 26 will produce different electrical signals which can be distinguished to indicate the measured state.

An ultrasonic transducer which may be used to generate the ultrasonic transmission signal and receive the subsequent echoes is illustrated in FIG. 1A. Although FIG. 1A shows only piston sensor 25, piston sensor 26 may be similarly constructed. The ultrasonic transducer may comprise a piezoelectric crystal 40 sandwiched between electrical contacts 41 and 42. A couplant layer 43 is provided between contact 42 and the outside surface 27 of cylinder wall 10 to facilitate effective ultrasonic transmission. Couplant layer 43 may be easily formed using an appropriate gelatinous substance. It is recommended that such a substance be nonreactive and preferably water based, such as Ultragel II couplant. In situations in which a generally greater degree of couplant loss may be tolerated, couplant layer 43 may be permanently formed using a thin film of polymeric material. A damping material 44 behind contact 41 absorbs unwanted ultrasonic energy transmitted back into sensor 25. A spring 45 urges the ultrasonic transducer into secure engagement against outside surface 27.

Figure 2A:
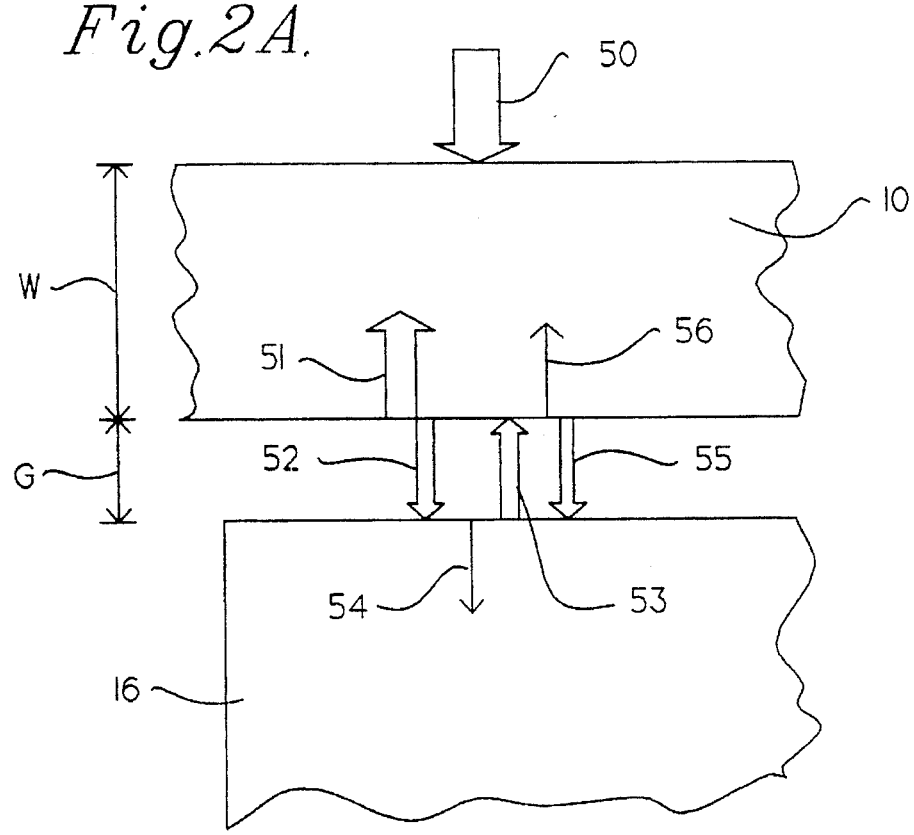
FIGS. 2A and 2B are a fragmentary diagrammatic elevation and diagrammatic end view, respectively, illustrating transmission and reflection of ultrasonic energy within a power actuated cylinder.

Referring to FIG. 2A, the propagation characteristics of an ultrasonic transmission signal 50 such as may be generated by ultrasonic transducers 25 and 26 is illustrated. For purposes of illustration only, the various remainder and echo signals that will be described are shown as laterally displaced. Propagating energy from signal 50 will in this case encounter two significant interfaces which will influence the magnitude of energy subsequently reflected back to the transducer. Specifically, signal 50 first travels a distance W equal to the width of cylinder wall 10. There it encounters an interface defined by the boundary between cylinder wall 10 and the gap between wall 10 and piston 16. At this wall-gap interface, most of the energy originally contained in signal 50 is reflected back towards to the transducer, as shown by echo 51. The remainder 52 of the energy in signal 50 will continue into the gap.

After traveling a distance G equal to the gap between piston 16 and wall 10, the second interface, defined by the boundary between the gap and piston 16, will be encountered. At this gap-piston interface, most of the energy in remainder 52 will again be reflected, as shown by echo 53. A remainder 54 of the energy in remainder 52 will continue into piston 16. After traveling distance G, echo 53 will encounter the wall-gap interface where, as shown by echo 55, most energy will again be reflected. A remainder 56 of echo 53, however, will continue into cylinder wall 10. As can thus be seen, remainder 56 will only result when piston 16 is in such a position that energy from signal 50 may be reflected. The control circuitry of the device interprets the total ultrasonic echo signal to determine whether echo 56 is present.

Figure 2B:
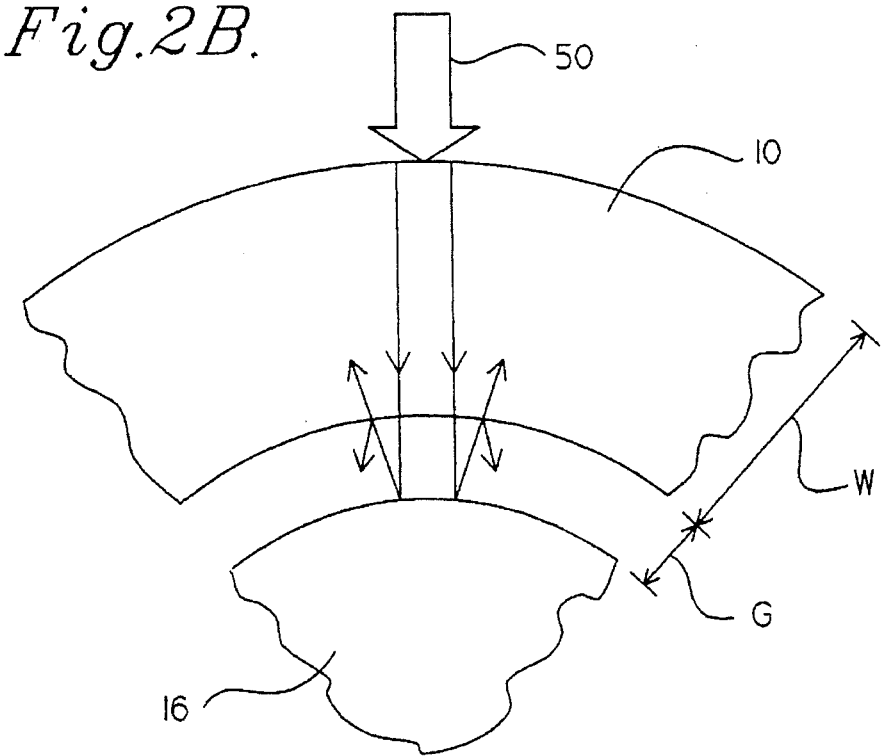

Assuming that cylinder wall 10 and piston 16 are constructed of metal such as steel, and the wall to piston gap is filled with hydraulic fluid, the expected energy of echo 56 may be calculated. Specifically, the percentage of energy in each echo may be found using the following equation:

Reflection=$[(Z_1-Z_2)/(Z_1+Z_2)]^2 \times 100\%$ where $Z_1$ is the acoustic impedance in the material through which the energy is first propagating and $Z_2$ is the acoustic impedance of the material on the other side of the interface. Using a figure of $4.56 \times 10^6$ as the acoustic impedance of steel and $0.128 \times 10^6$ as the acoustic impedance of hydraulic fluid yields the following: (1) signal 50=100% energy; (2) echo 51=89.4% energy; (3) remainder 52=10.6% energy; (4) echo 53=9.5% energy; (5) remainder 54=1.1% energy; (6) echo 55=8.496% energy; and (7) remainder 56=1.004% energy. This calculation ignores any focusing or scattering effects due to the curvature of the respective interfaces. Referring to the end view of FIG. 2B, it becomes apparent that these effects may tend to scatter energy away from the transducer. As a result, it may be proper to further reduce the estimated energy of echo 56 to below this value of approximately 1%.

using these calculations only, it is dubious that sufficient signal-to-noise ratio (SNR) could be provided for many practical applications. As a result, it would be difficult to distinguish using a 1% detection signal between the piston present and piston absent states. According to the invention, however, SNRs greater than 20db have been experimentally obtained. This represents echo energy having amplitudes up to ten times or more that of errant noise. Such SNRs provide signals which are easily detectable in most practical applications. These results are believed to be obtained by the frequency of the ultrasonic transmission signal experiencing a degree of resonance in the gap between wall 10 and piston 16. The mean value of this gap is frequently given as a production specification for the particular cylinder model. A range within which the value of this gap may typically vary is approximately 0.003 inches to 0.023 inches. The cylinder wall thickness may typically vary within a range of approximately 0.1170 inches to 1.04 inches.

Resonance may best be obtained if the wavelength of the chosen frequency of signal 50 is approximately four times the mean gap width G. It is also important, however, that the fundamental frequency of signal 50 have significant wavelength with respect to the cylinder wall. Thus, in presently preferred embodiments the wavelength of the chosen frequency should be no more than one-tenth the width W of cylinder wall 10. Other factors, which may be more significant in some embodiments than in others, also influence the choice of frequency. For example, it is desirable to use higher frequencies to facilitate damping within the piston sensor itself, thus contributing to an overall reduction in size. At very high frequencies, however, a piezoelectric transducer will become so small that it may be difficult to manufacture. For most expected applications of the device, the resulting ideal frequency will generally lie somewhere within the range of 1–25 MHz. Generally, the signal frequency may be expected to fall within the range of 8–12 MHz.

Signal-to-noise characteristics may be improved in some cases by forming the ultrasonic transmission signal of a pulse train of driving pulses. The number of driving pulses is typically derived experimentally for the particular cylinder model. With various cylinder models, suitable SNRs may be obtained with the number of driving pulses generally ranging from one to seven. The particular number within this range generally depends on the specific cylinder model.

Figure 3A:
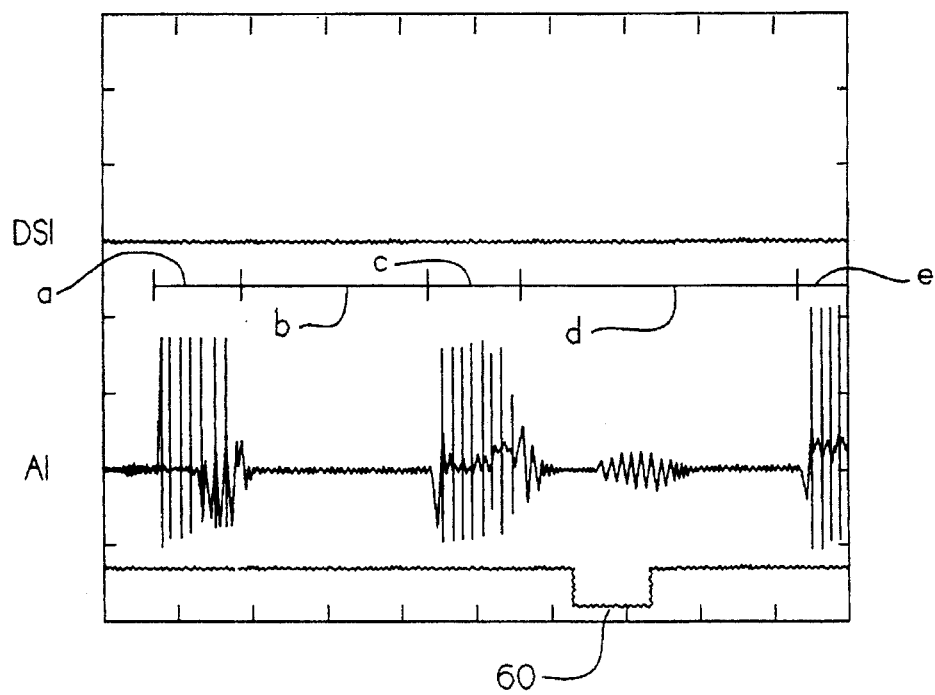
FIGS. 3A ant 3B are graphical plots illustrating various signal waveforms produced when the piston is respectively absent and present adjacent the piston sensor.
Figure 3B:
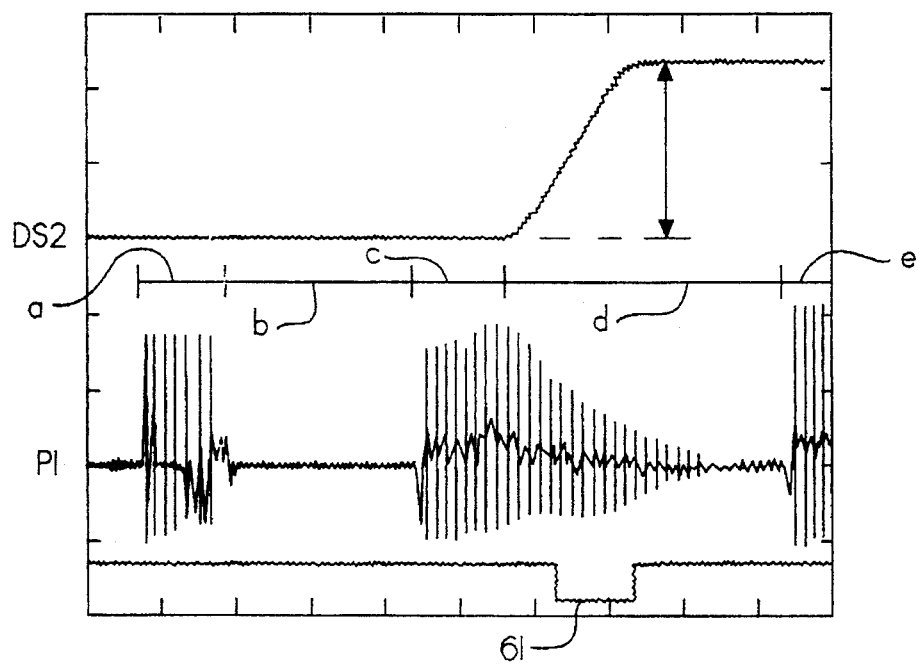

Some of the distinguishable signal characteristics between the piston absent and piston present states are illustrated in FIGS. 3A and 3B. Referring particularly to FIG. 3A, trace A1 illustrates the electrical signal across the ultrasonic transducer in the piston absent condition. Trace A1 can be best understood if it is divided into a number of distinct time periods. The plot occurring during period "a" indicates the ultrasonic transmission signal generated by the transducer as well as a number of subsequent echoes occurring within the body of the piston sensor itself. The transducer then experiences a quiet time during period "b" in which the ultrasonic transmission signal is propagating through the cylinder wall. After reflection from the wall-gap interface, some of the energy from the ultrasonic transmission signal returns in the form of an initial echo. The quiet time during period "b" is thus an indication of the time-offlight of the ultrasonic transmission signal in the cylinder wall, which is itself indicative of cylinder wall thickness. The initial echo will excite the transducer for a period "c" after which will occur a second quiet time during period "d". A second echo (partially shown) is received by the transducer during period "e".

Referring particularly to FIG. 3B, it can be seen that, as expected, trace P1 is similar to trace A1 during periods "a", "b" and "c". During period "d", however, the received signal of trace P1 is significantly higher than in trace A1. This energy slowly dissipates until reception of the second echo at the beginning of period "e". This signal difference during period "d" is evidently due to reflection from the outer surface of the piston. It is especially noteworthy that, particularly immediately after period "c", the signal level is significantly greater than the 1% return predicted by the analysis accompanying FIG. 2A. This relatively high signal level is easily detectable by the control circuitry.

To detect the signal reflected from the piston, presently preferred embodiments of the invention utilize a sample time window technique. Specifically, a sample time window is synchronized to begin at a selected start time after generation of the ultrasonic transmission signal. This sample time window remains "open" for a selected duration within which a piston detection signal is derived. In presently preferred embodiments, the sample time interval, or "window," is synchronized to derive the piston detection signal during the time in which energy reflected from the outer surface of the piston is expected. For example, referring to FIG. 3A, a sample time window 60 is illustrated by the trace immediately below trace A1. Window 60 has a start time corresponding to the beginning of period "d" and continues for a short duration thereafter. A similar sample time window 61 is illustrated in FIG. 3B in the trace immediately below trace P1.

The detection signals thus derived are shown in traces DS1 and DS2 of FIGS. 3A and 3B, respectively. In the piston absent condition, trace DS1 maintains a nearly constant level throughout the display. As shown in trace DS2, however, the detection signal will rise to a significantly value in the piston present state where it may be maintained by the control circuitry. By comparing the final energy level signal at period "e" with a selected threshold level, a decision can be made as to whether a piston present or present absent state prevails.

In certain situations, the gap width G between the cylinder wall and the piston outer surface may be smaller than necessary to achieve proper resonance. For example, a heavy side load on a horizontally mounted piston may cause an otherwise sufficient gap width to become very small at the top surface of the piston. In this case, it may be possible to simply mount the piston sensor on the bottom or side of the cylinder assembly where gap widths should remain of a sufficient value.

In other cases, such as when the cylinder is manufactured having gap width insufficient for resonance, a slight modification of the signal processing techniques may be required. The piston, however, may be detected according to the teachings of the invention even in the complete absence of an identifiable gap between the piston and the cylinder wall. For example, referring again to FIG. 2A, a gap width G of zero will cause a measurable reduction in the energy of echo 51. In other words, a greater percentage of ultrasonic transmission signal 50 will continue into piston 16. As a result, the amplitude during period "c" in a trace of the electrical signal produced at the ultrasonic transducer will be less than that of the piston absent state shown in trace A1. To measure this lower energy level, the sample time window may be synchronized to occur during period "c." The detection signal produced during this sample time window can then be compared with a preselected threshold level. If the detection signal is less than this threshold, the piston present state can be deemed to exist.

Figure 4:
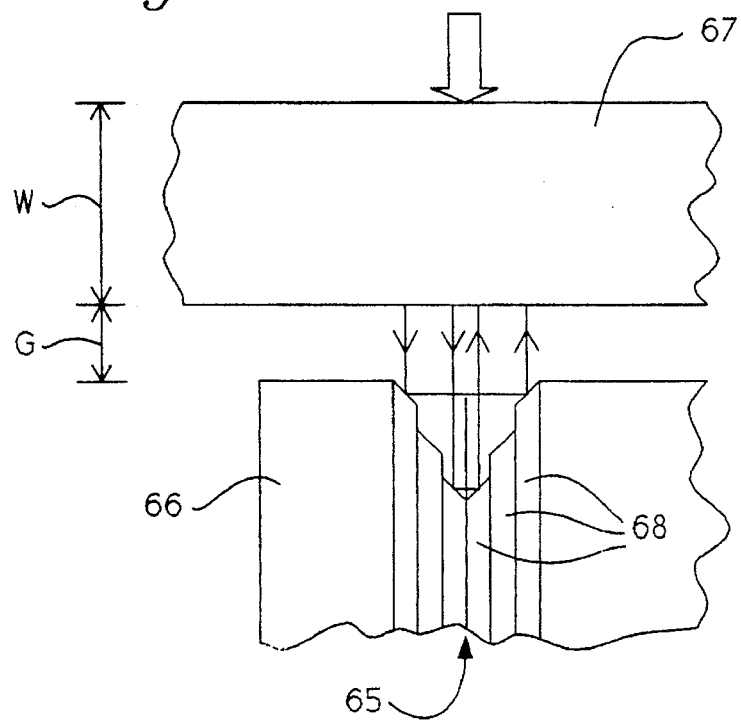
FIG. 4 is a diagrammatic representation illustrating ultrasonic propagation characteristics resulting when the piston is modified by having an annular groove formed about the circumference thereof.
Figure 5:
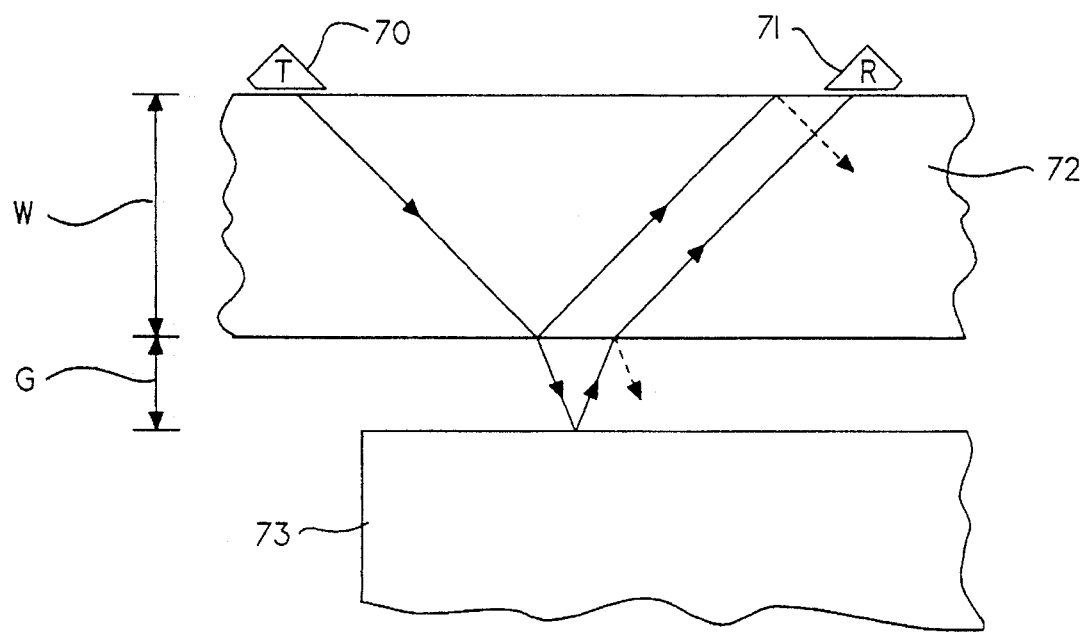
FIG. 5 is a diagrammatic representation illustrating propagation of ultrasonic energy when a pair of ultrasonic transducers (T and R) are utilized with each piston sensor.
Figure 6:
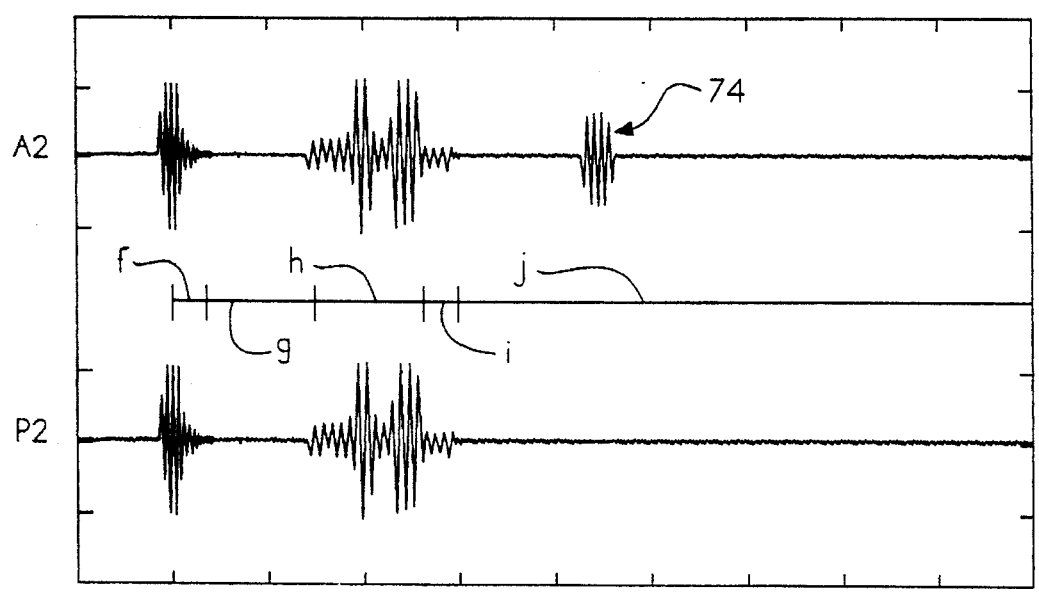
FIG. 6 is a graphical plot illustrating signal waveform conditions resulting from the configuration of FIG. 5 in the piston absent and piston present states, respectively.
Figure 8A:
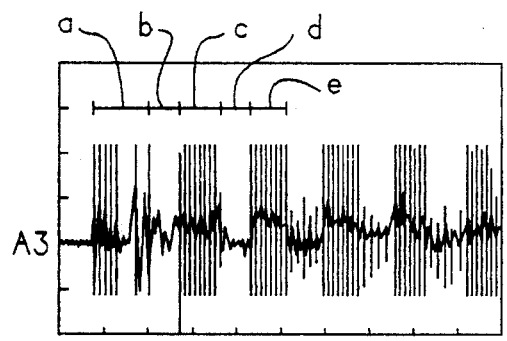
FIGS. 8A through 8C are graphical plots of signal waveforms produced in respective of the cylinder models of FIG. 8 in the piston absent state.
Figure 8D:
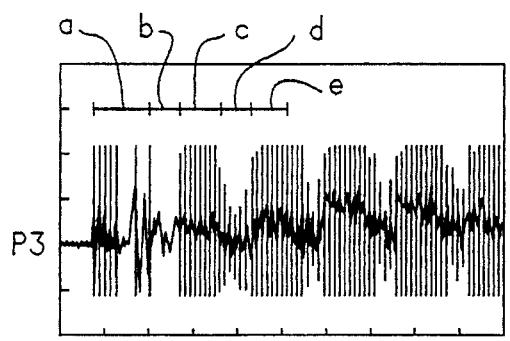
FIGS. 8D through 8F are graphical plots of signal waveforms produced in respective of the power actuated cylinder models of FIG. 8 during the piston present state.
Figure 8B:
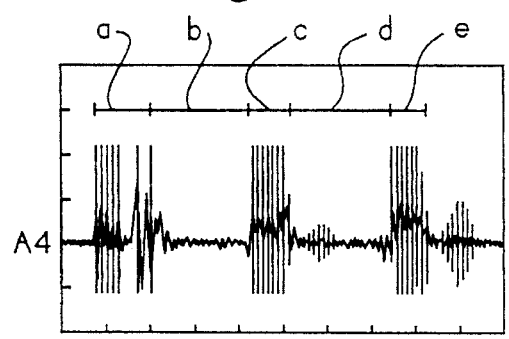
Figure 8E:
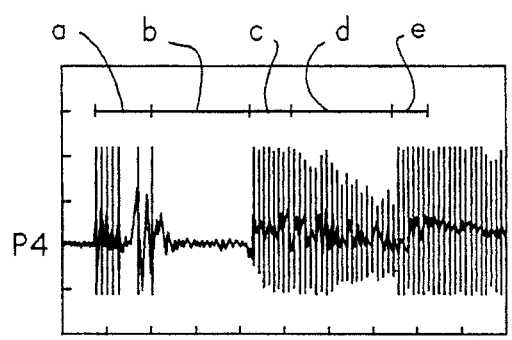
Figure 8C:
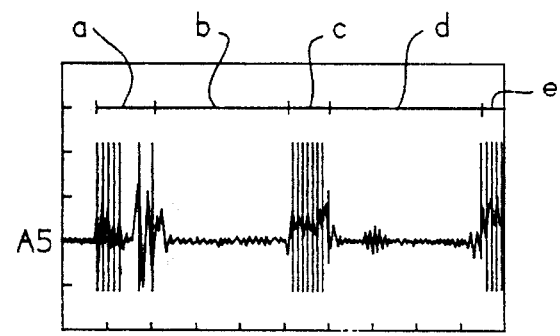
Figure 8F:
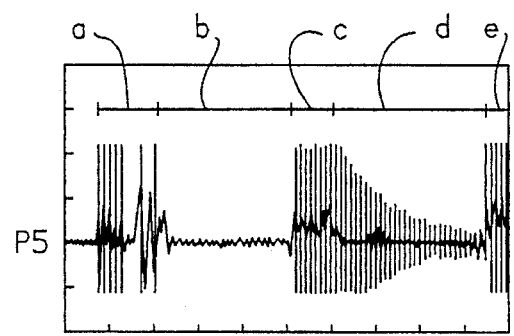

Referring now to FIGS. 4 through 6, alternative embodiments of certain aspects of the invention will be illustrated which may have utility in specific applications. In some applications, for example, it may be desirable to modify the piston itself such that a resonant cavity is continually maintained. A presently preferred technique for maintaining such resonance is illustrated in FIG. 4. An annular groove 65 formed in piston 66 maintains a resonant cavity at the interface of cylinder wall 67 and the hydraulic fluid even in the event that the gap width G is reduced to zero. Instead of a simple V-shape, groove 65 employs a complex configuration of multiple stepped surfaces 68 which are sloped upward to permit a number of path lengths for the reflected ultrasonic energy. A simple "V" groove, on the other hand, would permit only one such path length. As a result, the configuration of groove 65 permits resonance to occur at a wider range of frequencies.

Referring particularly to FIG. 5, an alternative piston sensor is illustrated utilizing a pair of transducers 70 and 71 positioned at spaced apart locations on the outside of cylinder wall 72. When one of transducers 70 or 71 is used as a transmitter, the other is awaiting reception of the ultrasonic echo signals thus produced. For example, assume transducer 70 is functioning as a transmitter (T) and transducer 71 is functioning as a receiver (R). The ultrasonic transmission signal may be injected into cylinder wall 72 at a selected angle such that transducer 71 will effectively receive the echo energy caused by reflection from piston 73. Traces A2 and P2 of FIG. 6 respectively show electrical signals at the transducers in the piston absent and piston present states. During periods "f", "g" and "h" traces A2 and P2 are similar. During period "i", however, trace P2 has a higher signal level due to reflection from piston 73. An interesting aspect of this configuration is revealed during period "j". Other than the echo referenced as 74, subsequent echoes are generally absent from traces A2 and P2. This is because they have been reflected down the cylinder wall away from transducer 71.

The presence of echo 74 can be advantageously used in some applications to detect the presence of the piston at both limits of its reciprocative stroke utilizing a single piston sensor. Specifically, the piston sensor may be placed adjacent one stroke limit to directly detect the piston as described above. To determine that the piston has extended to its other stroke limit, reflection from the piston shaft is monitored. At extension of the piston, pressure will cause fluid behind the piston to experience an increase in density. This increase in density results in a corresponding increase in the time of flight of echo 74, the detection of which can serve as an indicator that the piston has reached its stroke limit.

In order no provide greatest operative flexibility, the proximity detector may be adaptable for use with any one of a plurality of cylinder models. For example, power actuated cylinders are frequency offered by manufacturers as a line of cylinders having different bore sizes. Such a line 80 of power actuated cylinders is illustrated in FIG. 7 having respective cylinders 80a, 80b and 80c. While cylinders 80a, 80b and 80c generally have similar ultrasonic energy propagation characteristics due to their similar construction, differences will generally exist. For example, the respective cylinders within the line may have different cylinder wall thicknesses or mean gap widths between the piston and cylinder wall. As a result, each will exhibit slightly different ultrasonic energy propagation characteristics. For best performance, the operating parameters of the control circuitry are preferably altered for each cylinder model with which the proximity detector will be used. While cylinder selection to set up the operating parameters of the control circuitry may be accomplished manually using a switch or the like, presently preferred embodiments include means for automatically making such selection.

The different ultrasonic propagation characteristics between cylinder models 80a, 80b and 80c can best be described with reference to FIGS. 8A through 8F. Trace A3 of FIG. 8A corresponds to a piston absent condition in cylinder 80a. Trace P3 shown in FIG. 8D corresponds to a piston present state in cylinder 80a. Similarly, traces A4 and P4 respectively illustrated in FIGS. 8B and 8E correspond to respective piston absent and piston present states in cylinder 80b. Traces A4 and P4 of FIGS. 8C and 8F, respectively, likewise correspond to piston absent and piston present states in cylinder 80c.

FIGS. 8A through 8F clearly illustrate that, due to differences in cylinder wall thickness, the quiet time (period "b") between generation of the ultrasonic transmission signal and first reception of the initial echo will be different for cylinders 80a, 80b and 80c. Thus, in each of these cases, the sample time window must begin at a different time with respect to generation of the ultrasonic transmission signal.

Other operating parameters of the proximity detector may need to be adjusted for effective operation with each of cylinder models 80a, 80b and 80c. For example, the driving frequency of the ultrasonic transmission signal is preferably related to the cylinder wall thickness and mean gap width as discussed above. Thus, if these variables are different in cylinder models 80a, 80b and 80c, the driving frequency should preferably be adjusted accordingly. Also, the particular number of driving pulses comprising the ultrasonic transmission signal may produce improved signal-to-noise characteristics with respect to a specific one of cylinder models 80a, 80b and 80c. The preferred threshold levels used to determine presence or absence of the piston may also be different depending on the cylinder model with which the proximity detector is being used. Also, to optimize SNR without saturation, it may be desirable for a particular cylinder model to adjust the gain by which the echo signal produced across the ultrasonic transducer is amplified.

Figure 9:
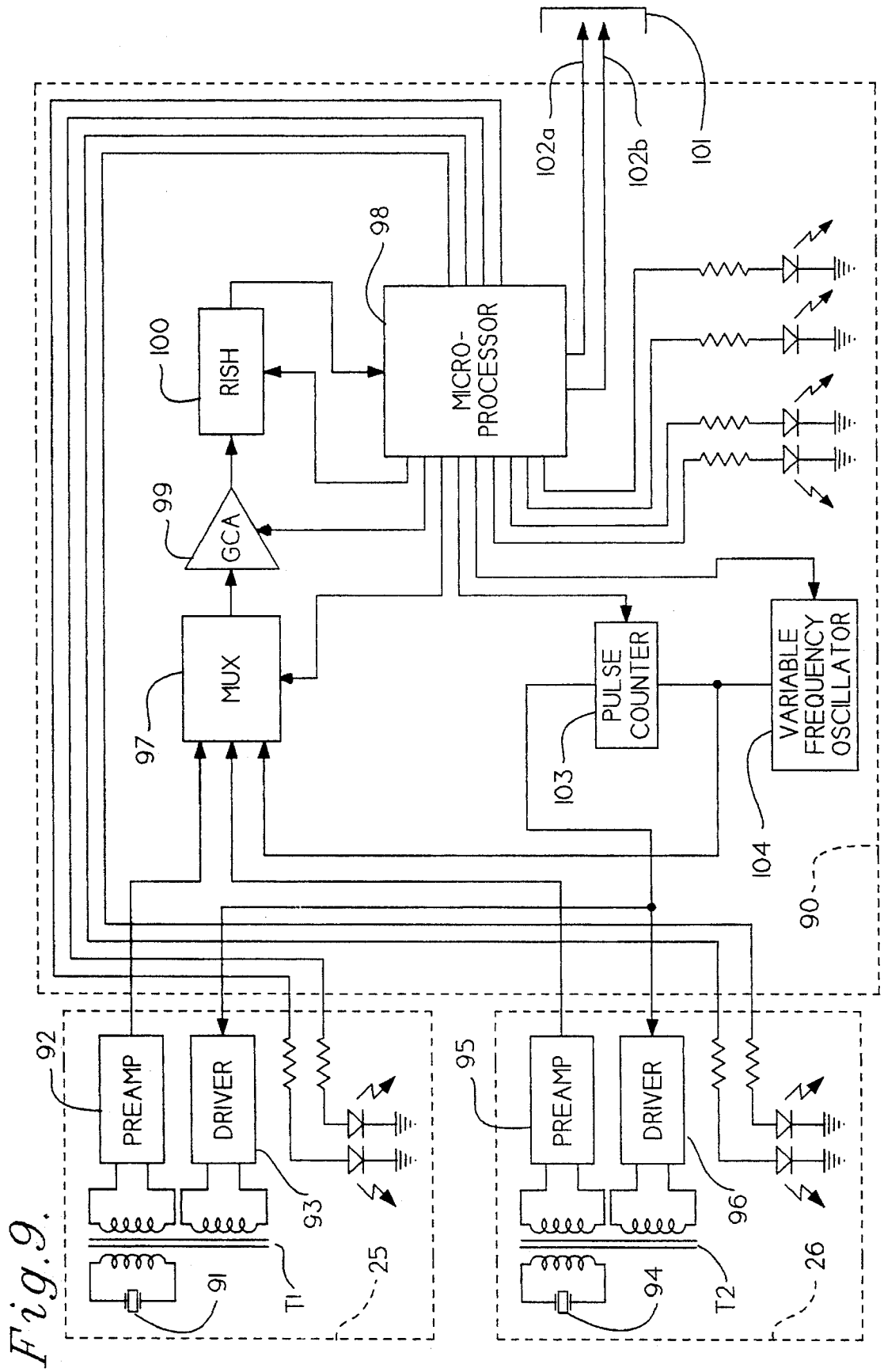
FIG. 9 is a schematic representation of a presently preferred embodiment of a circuit for the proximity detector device of the invention.

The circuitry utilized in presently preferred embodiments of the proximity detector device is illustrated in FIG. 9. Each piston sensor 25 and 26 contains a number of circuit components which cooperate with control circuitry 90 (located within housing 29 of FIG. 1) to function in the desired manner. The LEDs illustrated in FIG. 9 correspond to those shown in FIG. 1. Piston sensor 25 contains a piezoelectric transducer 91 coupled through transformer T1 to a preamplifier 92 and a high current pulse driver 93. Similarly, piston sensor 26 contains a piezoelectric transducer 94 coupled through transformer T2 through preamplifier 95 and high current driver 96. Transformers T1 and T2, which are preferably wound in a 1:1 ratio, provide DC isolation between the respective transducers 91 and 94 and other circuit components. Transducers 91 and 94 are preferably sized to resonate at the center frequency of the bandwidth over which the ultrasonic transmission signals are expected to vary. For example, if it is desired that the transmission signals vary over a range of 8–12 MHz, transducers 91 and 94 may be sized to be resonant at 10 MHz.

To avoid duplication of circuit components as well as to prevent gain imbalances which may occur with such duplication, the outputs of preamplifiers 92 and 95 are fed to respective inputs of multiplexer ("MUX") 97. In presently preferred embodiments, piston sensors 25 and 26 are controlled by microprocessor 98 to operate in alternating sequence. Multiplexer 97 is thus also controlled by microprocessor 98 to receive electrical echo signals only from the active of piston sensors 25 and 26.

The output of multiplexer 97 is fed to amplifier 99. For use with a wide range of cylinders, amplifier 99 is a gain controllable amplifier ("GCA") wherein the gain is selectable by microprocessor 98 depending on the particular cylinder model with which the proximity detector device is being utilized. Amplifier 99 may also incorporate a bandpass filter having an upper cutoff frequency several megahertz higher than the driving frequency of the transmission signal. For example, if the highest frequency transmitted signal expected will occur at 12 MHz, a three-to-five pole 20 MHz passband edge should be sufficient. Preferably, the output of amplifier 99 is also clamped so as not to exceed a certain maximum level.

The high frequency output of amplifier 99 is then passed to signal level detection circuitry 100 which produces the piston detection signal. Microprocessor 98 then converts the piston detection signal to digital format using an internal analog-to-digital converter. Although shown as a block, circuitry 100 comprises in presently preferred embodiments a number of circuit elements which function to Rectify, Integrate, Sample and Hold the electrical signal across the piezoelectric transducer during the sample time window. As such, circuitry 100 is collectively referred to as ("RISH") circuitry. The start time and duration of the sample time window, which may be placed at any point after generation of the ultrasonic echo signal, are communicated to circuitry 100 by an input from microprocessor 98.

The detection signal (in digital format) is compared by microprocessor 98 with the selected threshold levels to produce signals at output 101 indicating presence or absence of pistons 16 adjacent sensors 25 or 26. For example, output line 102a may indicate presence of piston 16 adjacent piston sensor 25 with a digital high output. A digital low output on line 102a will thus indicate absence of piston 16 beneath piston sensor 25. Similarly, high or low outputs on line 102b may indicate respective piston present or piston absent states adjacent piston sensor 26.

Microprocessor 98 further directs operation of pulse counter 103 and variable frequency oscillator 104. Pulse counter 103 and variable frequency oscillator 104 together comprise transmission means which control characteristics of the ultrasonic transmission signal to provide best results with a particular cylinder model. In presently preferred embodiments, oscillator 104 comprises a phase lock loop ("PLL") frequency generator capable of generating an oscillatory output signal having a frequency ranging from 8.0 MHz to 12.0 MHz in 0.5 increments. Pulse counter 103 then modulates the oscillatory output signal of oscillator 104 by an appropriate number of driving pulses. Note that multiplexer 97 is connected to also receive an input from variable frequency oscillator 104. This input may be used as desired for periodic calibrations or other diagnostic purposes.

Figure 10:
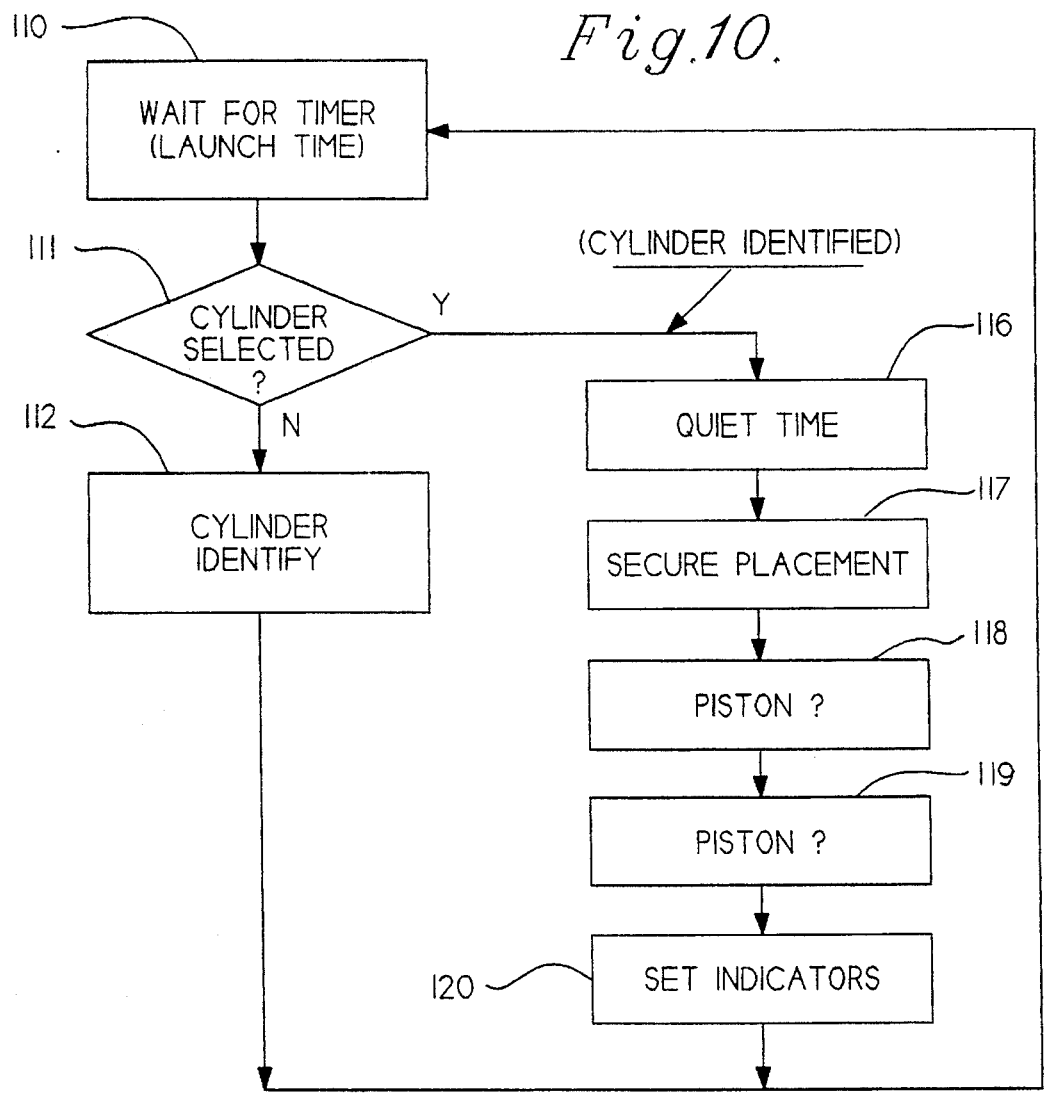
FIG. 10 is a block flow diagram of control software implemented to effect various functions which may be performed by a presently preferred embodiment of the proximity detector device of the invention.

Referring to FIG. 10, software implemented by microprocessor 98 in presently preferred embodiments is generally illustrated. As indicated by block 110, each software cycle is set to begin at a launch time slightly greater than the period required to execute the software. At each launch time, the software alternates between piston sensors 25 and 26. Thus, for example, a 10 mS launch time indicates that sensor 25 or 26 will each be actuated every 20 mS. Next, as shown by block 111, the software determines whether the particular cylinder model with which the proximity detector device is being used has been identified. If not, the software enters a "cylinder identify" subroutine indicated generally by block 112. After the cylinder has been identified, the cylinder identify subroutine exits and the software awaits the next launch time.

If the cylinder has been selected, the software implements a series of four similar tests shown by blocks 116 through 119, respectively. The first test is used to verify that a quiet time exists for the specific cylinder. If the quiet time cannon be verified, the cylinder selection is cancelled. The second test measures signal strength of the returned echo and is used to verify secure placement of the respective piston sensor on the cylinder housing wall. Unsatisfactory results from either of the first two tests causes the corresponding yellow LED to be activated. The third and fourth tests are used to determine whether the piston is present or absent beneath the respective piston sensor. If either of these tests indicates that a piston present condition prevails, the proper indicators and outputs will be set (as shown generally by block 120). For enhanced noise immunity, presently preferred embodiments require each test to achieve the same result several times before a change of final state is indicated.

To achieve automatic identification of a particular cylinder from a number of such cylinders known to the microprocessor, it is only necessary that the respective cylinders have one recognizable ultrasonic propagation characteristic. In presently preferred embodiments, this characteristic is based on the differences in cylinder wall thickness which generally appear between different cylinder models within an overall line. Specifically, different cylinder wall thicknesses will yield a particular time-of-flight between generation of the ultrasonic transmission signal and first receipt of the initial echo. By selectively generating a sequence of ultrasonic transmission signals and measuring the signal level in respective of successively delayed sample time windows, a detailed profile of the time-of-flight characteristic can be assembled in the microprocessor. Based on this profile, the particular cylinder model may be identified.

Figure 11:
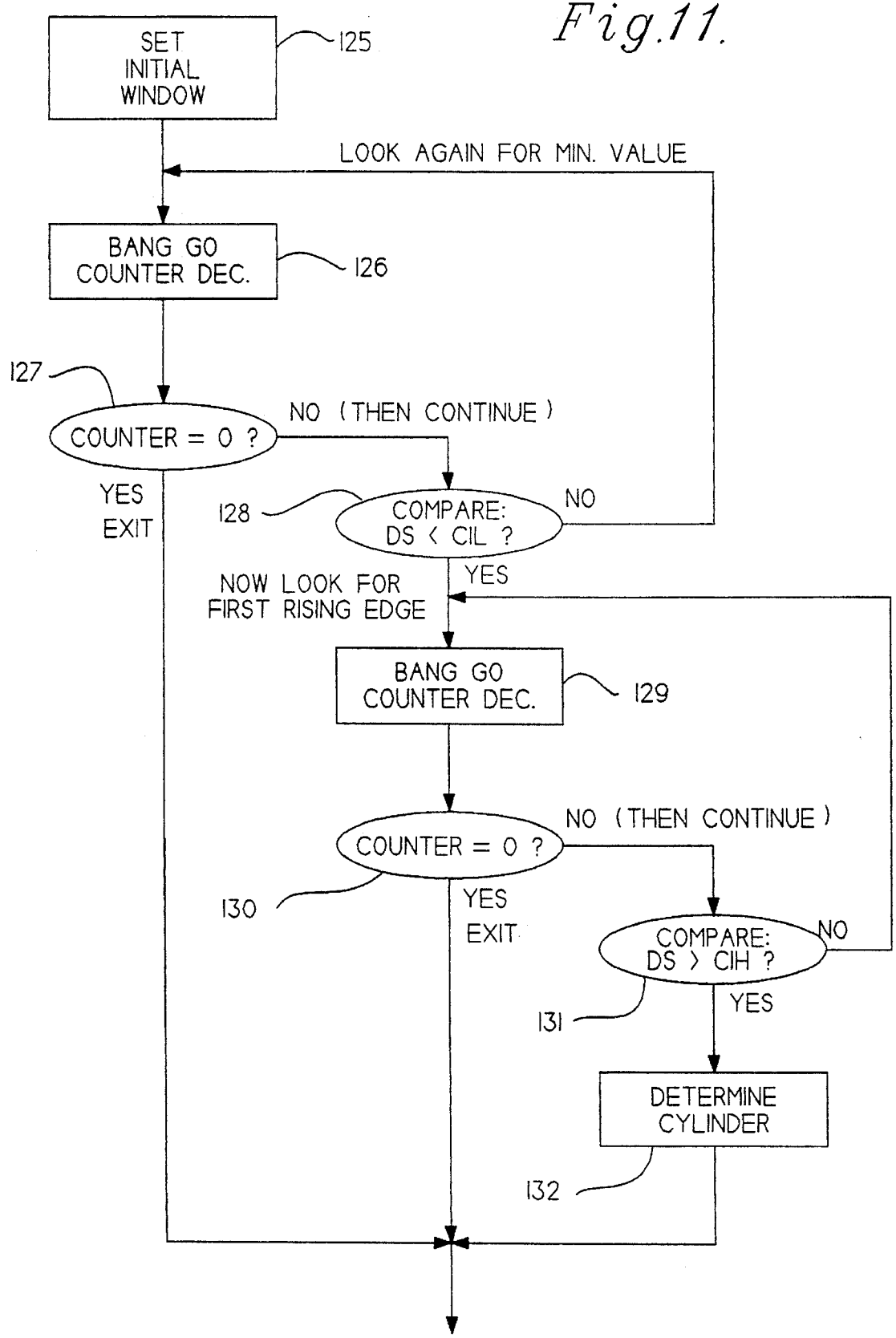
FIG. 11 is a block flow diagram of the cylinder identify subroutine shown generally in FIG. 10.

Referring to FIG. 11, a presently preferred "cylinder identify" subroutine utilizing this technique is illustrated. First, as shown in block 125, the sample time window is initially set near the time when the first quiet time (period "b") should begin. Next, as indicated in block 126, an ultrasonic transmission signal ("bang") is initiated. Additionally, a counter is decremented which is initially set to the number of successive ultrasonic transmission signals which will be generated to derive the time-of-flight profile. As shown in block 127, when the counter does not equal zero, the software will begin a loop searching for the first quiet time. This is accomplished as shown in block 128 by a comparison to determine whether the detection signal ("DS") is less than a selected threshold which may be referred to as a cylinder identify low level ("CIL"). If the detection signal is not less than level CIL, then the loop goes back to block 126 for generation of another ultrasonic transmission signal. At the same time, the counter will be decremented. If the counter reaches zero without the quiet time being verified, the subroutine exits. This condition may exist, for example, if too much couplant is applied to the piston sensor.

Referring again to block 128, verification of the quiet time will begin a second loop to identify first receipt ("rising edge") of the initial ultrasonic echo. As shown in block 129, an ultrasonic echo signal is again generated and the counter is decremented. If the counter reaches zero without the rising edge having been identified, then the subroutine exits as shown by block 130. If, however, the counter does not equal zero then the detection signal is compared with a threshold which may be referred to as a cylinder identify high level ("CIH"). As shown in block 131, if the detection signal is not greater than level CIH, then the loop is sequentially repeated until such is the case. When the detection signal exceeds level CIH, the time-of-flight between generation of the ultrasonic transmission signal and first receipt of the initial echo will be determined. As indicated by block 132, the subroutine uses this information to determine the particular cylinder model.

Figure 12:
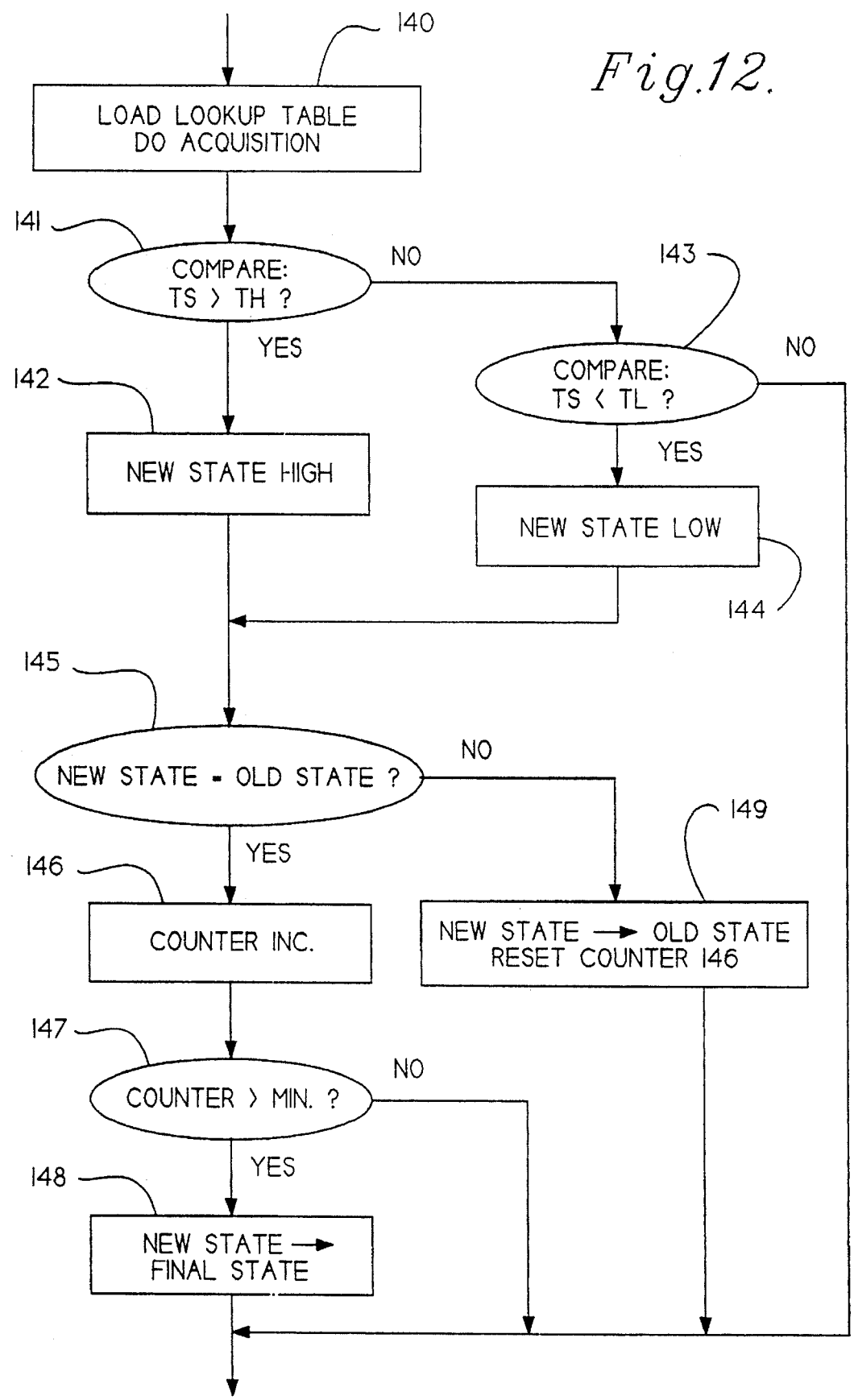
FIG. 12 is a block flow diagram generally illustrating the four tests shown generally in FIG. 10.

FIG. 12 shows a block flow diagram which is generally illustrative of all four tests performed by microprocessor 98 after the cylinder selection has been accomplished. For each cylinder model, each test has a dedicated look-up table containing the respective threshold values and the like which are to be used by that test. Thus, in presently preferred embodiments, the total number of look-up tables stored in the device will be equal to four times the total number of cylinder models for which the device is useable. FIG. 13 illustrates generally such a look-up table 135 containing different characteristics or parameters in each of a plurality of memory locations. In many applications, it will be desirable to permanently set the look-up table at the time of manufacture using read only memory ("ROM"). For greatest flexibility, however, programmable read only memories ("PROM") can be used, thus allowing subsequent alteration of the respective look-up table values.

Referring again to FIG. 12, it is shown in block 140 that the first step performed by each of the four tests is the loading of the appropriate look up table. Also as shown in block 140, the test next performs an "acquisition sequence." In presently preferred embodiments, the acquisition sequence comprises a number of detection signals respectively produced from successive ultrasonic transmission signals. The sum of these detection signals may be divided by the number of ultrasonic transmission signals in the acquisition sequence to arrive at an average value. This average value may be referred to as total sum ("TS"). The acquisition sequence therefore provides a degree of immunity from errant noise or other extraneous influences within could have a greater effect on a single piston detection signal.

Next, as shown in block 141, total sum TS is compared with the selected threshold high level ("TH") for the cylinder model. As shown in block 142, a value of total sum TS greater than threshold high level TH will cause a new state high to be indicated. If, however, total sum TS is not greater than the threshold high level TH, in is compared with the relevant threshold low level ("TL"). As shown in block 143, if total sum is not less than the threshold low level, the test is exited with no change in final state. As result of this hysteresis, the device is provided with an enhanced degree of stability. If total sum TS is indeed less than threshold low level TL, a new state low is indicated as shown in block 144.

The high or low level in the new state thus obtained is next compared to the previous state. If the test has produced the same result as that previously obtained, new state and old state will be the same. This comparison is illustrated in block 145. If the new state is equal to the old state, a counter may incremented as shown by block 146. Next, as illustrated by block 147, a comparison is performed of the current counter value with a predetermined minimum number of cycles in which the states must correspond in order for a final state change no be indicated. If the counter has not reached the predetermined minimum, then the test exits with no final state change. If, however, the counter reaches the predetermined minimum, then the final state of the test may be updated to that of the new state. This is indicated in block 148. A difference in new state and old state, on the other hand, causes this subroutine to exit without an affirmative change of state. However, as shown by block 149, the new state is substituted for the old state for comparison during the next cycle. Additionally, the counter illustrated in block 146 is reset to zero.

It can thus be seen than the invention provides a generally noninvasive device and method to detect a reciprocative piston located within a cylinder bore. The principles and teachings disclosed herein are susceptible to many variations which may find utility in particular applications. For example, in some situations it may be desirable to inject two ultrasonic signals of different fundamental frequencies into the cylinder wall where, in the presence of a piston, mixing would take place. One of the transducers could then await arrival of a return signal at the sum or difference frequency to indicate a piston present state.

In other applications a "trip detector" approach may be used in which a pair of ultrasonic transducers are respectively placed at opposite positions across the cylinder assembly. One transducer could then serve as a transmitter injecting an ultrasonic signal into the cylinder. If the piston is absent, the ultrasonic signal will be allowed to proceed to the other transducer. When the piston is present, however, the signal will be blocked. Such an absence of a received signal then serves as signal information indicative of piston presence.

Thus, while presently preferred embodiments of the invention and presently preferred methods of practicing the same have been shown and described, the invention is not limited thereto includes such other variations as may be desirable in certain applications. It is therefore to be distinctly understood that the invention is inclusive of such variations and any others as may be embodied and practiced within the full scope of the following claims.

I claim:

1. A noninvasive proximity detector device operable to detect a reciprocative piston located within a cylinder bore defined by a cylinder wall, said device comprising:

at least one piston sensor positionable adjacent an outer surface of said cylinder wall at a selected sensing location;

said piston sensor including ultrasonic transducer means for selectively generating an ultrasonic signal directed through said cylinder wall into said cylinder bore;

said ultrasonic transducer means further operative after generation of said ultrasonic signal to receive at least a portion of said ultrasonic signal after propagation thereof through said cylinder wall; and control means responsive to an electrical output of said ultrasonic transducer means to detect a position of said piston, wherein said control means is operative to detect a signal level in said at least a portion of said ultrasonic signal after propagation thereof through said cylinder wall and at least a portion of said cylinder bore during a sample time interval synchronized to have a start time a selected duration after generation of said ultrasonic signal, said sample time interval corresponding to period beginning a selected duration after receipt by said ultrasonic transducer means of an ultrasonic reflection from an interface defined by an inner surface of said cylinder wall.

2. The noninvasive proximity detector device of claim 1 wherein said control means is further operative to detect said piston by comparing said signal level with a selected threshold level.

3. The noninvasive proximity detector device of claim 2 wherein said control means is operative to derive a final detection signal to be compared with said selected threshold level by combining a selected number of successively detected signal levels.

4. The noninvasive proximity detector device of claim 3 wherein said control means combines by averaging said selected number of successively detected signal levels to produce said final detection signal.

5. The noninvasive proximity detector device of claim 1 further comprising variable frequency oscillator means for producing an oscillatory output signal having a fundamental frequency controlled by said control means.

6. The noninvasive proximity detector device of claim 5 wherein said fundamental frequency of said oscillatory output signal is generally within a range of eight megahertz to twelve megahertz.

7. The noninvasive proximity detector device of claim 5 further comprising pulse counter means for modulating said oscillatory output signal by a number of driving pulses controlled by said control means.

8. The noninvasive proximity detector device of claim 7 wherein said number of driving pulses is generally in the range of one to seven driving pulses.

9. The noninvasive proximity detector device of claim 1 wherein said control means comprises:

amplifier means for amplifying said electrical echo signal by a selected gain;

detection signal means for producing a detection signal during a sample time interval synchronized to have a start time a selected duration after generation of said ultrasonic signal; and comparator means for comparing said detection signal with a selected threshold level.

10. The noninvasive proximity detector device of claim 1 wherein said at least one piston sensor comprises a first and a second piston sensor positionable at first and second selected locations respectively adjacent limits of movement of said piston.

11. The noninvasive proximity switch device of claim 1 wherein said control means is operative after generation of said ultrasonic signal to receive an ultrasonic echo resulting from reflection of a portion of said ultrasonic signal from said piston.

12. A proximity detector device adaptable for use with a cylinder assembly to detect a reciprocative piston located within a cylinder bore defined by a cylinder wall, said device comprising:

ultrasonic transducer means positionable on an outside of said cylinder wall at a sensing location for selectively generating an ultrasonic signal directed through said cylinder wall into said cylinder bore;

said ultrasonic transducer means further operative to receive said ultrasonic signal after propagation thereof through said cylinder wall to produce a received electrical signal; and control means initially operative after positioning of said at least one piston sensor on said cylinder wall for identifying an identifiable ultrasonic propagation characteristic of said cylinder assembly, said ultrasonic transmission characteristic being a time-of-flight measurement of a duration between generation of said ultrasonic transmission signal and first reception of said received ultrasonic signal, said time-of-flight measurement indicative of a thickness of said cylinder wall, wherein said control means is operative to produce a detection signal during a sample time interval synchronized to have a start time a selected duration after generation of said ultrasonic signal, said start time of said at least one sample time interval being no less than said time-of-flight measurement.

13. The proximity detector device of claim 12 wherein said control means performs said time-of-flight measurement by respectively comparing a selected threshold level with a detection signal produced during successively delayed sample time intervals from a series of ultrasonic signals generated by said ultrasonic transducer means.

14. The proximity detector device of claim 12 wherein said control means is normally operative for processing said electrical signal to detect whether said piston is in proximity to said piston sensor.

15. A power actuated cylinder device having piston proximity detection capability, said device comprising:

a cylinder housing having a cylinder wall defining a cylinder bore therein and further defining first and second fluid passages into said cylinder bore;

a piston located in said cylinder bore and reciprocatively movable such that expandable fluid chambers are defined on each side of said piston, said first and second fluid passages providing ingress of actuating fluid into respective of said expandable fluid chambers;

at least one piston sensor mounted on an outside of said cylinder housing at a selected sensing location;

said piston sensor including ultrasonic transducer means for selectively generating an ultrasonic transmission signal directed through said cylinder housing into said cylinder bore;

said ultrasonic transducer means responsive to an ultrasonic echo signal produced by reflection of said ultrasonic transmission signal to produce a received electrical signal; and control means for processing said received electrical signal to detect whether said piston is adjacent said piston sensor, wherein said control means is operable to detect whether said piston is adjacent said piston by comparing a signal level derived during at least one sample time interval synchronized to have a start time a selected duration after generation of said ultrasonic transmission signal with a selected threshold level, said control means being operative to begin said start time of said sample time interval no less than a time-of-flight between generation of said ultrasonic transmission signal and reception of reflection of said ultrasonic echo signal from an interface defined by an inner surface of said cylinder wall.

16. The power actuated cylinder device of claim 15 wherein said at least one piston sensor comprises a first and a second piston sensor respectively positionable at first and second selected locations on said outside of said cylinder housing generally adjacent respective terminal limits-of movement of said piston.

17. The power actuated cylinder device of claim 15 wherein said ultrasonic transducer means includes a transmitter transducer positioned at a first location on said cylinder housing and a receiver transducer positioned at a second location on said cylinder housing.

18. The power actuated cylinder device of claim 15 wherein said piston defines a groove about a circumference thereof.

19. The power actuated cylinder device of claim 15 wherein said cylinder assembly is configured having a mean gap between an inner surface of said cylinder wall and a generally complementary outer surface of said piston such that resonant qualities are achieved as said ultrasonic transmission signal is reflected from said outer surface of said piston.

20. The power actuated cylinder device of claim 15 wherein a mean gap between an inner surface of said cylinder wall and a generally complementary outer surface of said piston is generally in the range of 0.003 inches to 0.023 inches.

21. The power actuated cylinder device of claim 20 wherein a thickness of said cylinder wall is generally in the range of 0.1170 inches to 1.04 inches.

22. A method of detecting presence of a piston reciprocating within a cylinder bore defined by a cylinder wall, said method comprising the steps of:

(a) impressing an ultrasonic transmission signal into said cylinder bore from an outside of said cylinder wall;

(b) receiving at said outside of said cylinder wall a received ultrasonic signal produced by said ultrasonic transmission signal;

(c) detecting a signal level in said received ultrasonic signal during a preselected sample time interval, said preselected time interval beginning a selected duration after receipt of an ultrasonic reflection from an interface defined by an inner surface of said cylinder wall;

(d) comparing said signal level with a first selected threshold level; and (e) indicating presence of said piston when said energy level exceeds said first selected threshold level.

23. A noninvasive proximity detector device operable to detect a movable member located within an assembly housing, said device comprising:

ultrasonic transmitter means mounted on an outside of said assembly housing for impressing a series of ultrasonic transmission signals into said assembly housing;

ultrasonic receiver means mounted on said outside of said assembly housing for receiving any ultrasonic signal produced by propagation of each of said series of ultrasonic transmission signals through at least a portion of said assembly housing;

said ultrasonic receiver means operative to convert ultrasonic signals received by said receiver means into corresponding electrical signals; and, control means operatively connected to said ultrasonic transmitter means and said ultrasonic receiver means to determine and update status of presence of said movable member based on electrical signals received subsequent to generation of each of said ultrasonic transmission signals, wherein said control means is operative to determine presence of said movable member by comparing a signal level of an electrical signal produced by said receiver means during a selected sample time interval with a selected threshold level, said sample time interval beginning a selected duration after receipt of an ultrasonic reflection from an interface defined by an inner surface of said cylinder wall.

24. The noninvasive proximity detector device of claim 23 wherein said ultrasonic transmitter means and said ultrasonic receiver means comprise a single ultrasonic transducer.

25. A noninvasive proximity detector operable to detect a reciprocative piston located within a cylinder bore defined by a cylinder wall, said detector comprising:

a first and a second piston sensor positionable at first and second selected locations adjacent respective limits of movement of said piston;

each said piston sensor including an ultrasonic transducer selectively generating a ultrasonic signal directed through said cylinder wall into said cylinder bore;

said ultrasonic transducer responsive to a portion of said ultrasonic signal reflected from said piston to produce an analogous electrical signal;

control means responsive to said ultrasonic transducer means for detecting a signal level in said portion of said ultrasonic signal reflected from said piston during a sample time interval corresponding to a period during which said portion of said ultrasonic signal from said piston is expected, said sample time interval beginning a selected duration after receipt of an ultrasonic reflection from an interface defined by an inner surface of said cylinder wall; and said control means further operative to detect said piston by comparing said signal level with a selected threshold level.

26. The noninvasive proximity detector of claim 25 wherein said ultrasonic signal has a fundamental driving frequency within a range of eight megahertz to twelve megahertz.

* * * * *

UNITED STATES PATENT AND TRADEMARK OFFICE
CERTIFICATE OF CORRECTION

PATENT NO. : 5,463,596
DATED : October 31, 1995
INVENTOR(S) : ALLEN J. SIEFKEN

It is certified that error appears in the above-indentified patent and that said Letters Patent is hereby corrected as shown below:

Column 2, line 46, "while" should read --While--.

Column 3, line 60, "in" should read --In--.

Column 4, line 53, "so" should read --to--.

Column 5, line 60, "Interface" should read --interface--.

Column 6, line 7, "using" should read --Using--.

Column 8, line 57, "no" should read --to--.

Column 8, line 60, "frequency" should read --frequently--.

Column 11, line 11, "cannon" should read --cannot--.

Column 12, line 42, "within" should read --which--.

Column 12, line 50, "in" should read --it--.

Column 12, line 66, "no" should read --to--.

Signed and Sealed this

Thirteenth Day of February, 1996

Attest:

BRUCE LEHMAN

*Attesting Officer*     *Commissioner of Patents and Trademarks*